US006490349B1

United States Patent
Garfinkel et al.

(10) Patent No.: US 6,490,349 B1
(45) Date of Patent: Dec. 3, 2002

(54) SYSTEM AND METHOD FOR SCAN-DIALING TELEPHONE NUMBERS AND CLASSIFYING EQUIPMENT CONNECTED TO TELEPHONE LINES ASSOCIATED THEREWITH

(75) Inventors: Simson L. Garfinkel, Cambridge; A. Samuel Gorton, Medford, both of MA (US); Michael S. Greenberg, Francestown, NH (US); Daniel J. Weber, Cambridge, MA (US)

(73) Assignee: Sandstorm Enterprises, Inc., Boston, MA (US)

( * ) Notice: Subject to any disclaimer, the term of this patent is extended or adjusted under 35 U.S.C. 154(b) by 0 days.

(21) Appl. No.: 09/216,101

(22) Filed: Dec. 19, 1998

(51) Int. Cl.[7] .............................................. H04M 3/00

(52) U.S. Cl. ............................ 379/265.02; 379/266.07

(58) Field of Search ................................ 379/201, 266, 379/265, 309, 216

(56) References Cited

U.S. PATENT DOCUMENTS

| | | | | |
|---|---|---|---|---|
| 5,341,412 A | * | 8/1994 | Ramot et al. | 379/216 X |
| 5,799,077 A | * | 8/1998 | Yoshii | 379/216 X |
| 5,815,566 A | * | 9/1998 | Ramot et al. | 379/216 X |
| RE36,416 E | * | 11/1999 | Szlam et al. | 379/88.09 |
| 5,999,617 A | * | 12/1999 | Oyanagi et al. | 379/201 X |

* cited by examiner

Primary Examiner—Creighton Smith
(74) Attorney, Agent, or Firm—Richard A. Jordan

(57) ABSTRACT

A telephone scan-dialing arrangement includes a listener module, at least one dialing control module and at least one dialing module, each dialing module being associated with a respective modem. The listener module receives a command to initiate a scan-dialing operation in connection with a profile that identifies, inter alia, telephone numbers to be dialed and operations to be performed during each call and telephone number selection criteria, and provides the identification of the profile to the dialing control module The dialing control module obtains from the profile a set of telephone numbers to be used during the scan-dialing operation and provides the obtained telephone numbers to respective ones of the dialer modules to be dialed for a call, along with information identifying operations to be performed during the call, as each dialer module finishes its previous call. During each call, each dialer module controls its associated modem to dial the telephone number provided thereto by the dialing control module and perform the specified operations. Each dialer module stores call result information in the profile based on results of the call. During each call the telephone scan-dialing arrangement can determine, if the call is answered, the dialer module can determine characteristics of equipment connected to the called telephone line, including whether the equipment is a voice answering equipment, such as a voice telephone or an automated voice answering system, a fax receiving device or a computer. If the answering equipment is an automated voice answering device or a computer, the telephone scan dialing arrangement can also attempt to penetrate the device or computer to determine the operating system and user name/password combination used to access the device or computer. The a profile is stored in the form of SQL (structured query language) database, and the telephone scan-dialing arrangement can generate reports from the call result information in the profile using templates in HTML, RTF or other convenient format.

14 Claims, 12 Drawing Sheets

FIG. 3

FTN/STATE TABLE 30

| ENTRY 31(1) | | | | | |
|---|---|---|---|---|---|
| STATE 32(s) | MATCH STRING 33(s) | FTN TO CALL 34(s) | NEXT STATE 35(s) | SYS ID STRING 36(s) | MATCH CONF 37(s) |
| ENTRY 31(S) | | | | | |

31(s)

PHONE NUMBERS TABLE 42

| NID 52(n) | PHONE NO 53(n) | TIME PERS 54(n) | NO CALL 55(n) | MODEM CALL 56(n) | FAX CALL 57(n) | PEN 58(n) | PEN CNT 59(n) | BZY 60(n) | CALLS TODAY 61(n) | CALLS TOTAL 62(n) | LAST CALLED 63(n) |
|---|---|---|---|---|---|---|---|---|---|---|---|
| 51(n) | | | | | | | | | | | |

CALL HISTORY TABLE 43

| CID 66(c) | CALLED NID 67(c) | PHONE NO 68(c) | STRT TM 69(c) | TM TO CON 70(c) | CALL TM 71(c) | MODEM ID 72(c) | RUN 73(c) | FAX CALL 74(c) | CALL RSLT 75(c) | USR NAME 76(c) | PASS WORD 77(C) | SYS IDFR 78(c) | PEN RSLT 79(c) |
|---|---|---|---|---|---|---|---|---|---|---|---|---|---|
| 65(c) | | | | | | | | | | | | | |

DIALING PROFILE TABLE 44

| PROFILE VARID 86(d) | PROFILE VAR VAL 87(d) |
|---|---|
| 85(d) | |

← PROFILE DATABASE 41

*FIG. 4A*

CALL DETAIL TABLE 46

| CID 91(c) | SNT TXT 92(C) | RCVD TXT 93(c) | NOTES TXT 93(C) |
|---|---|---|---|
| 90(c) | | | |

USER NAMES/PASSWORDS TABLE 45

| UPID 81(u) | USR NM 82(u) | PSWORD 83(n) |
|---|---|---|
| 80(u) | | |

TIME PERIODS TABLE 47

| PID 101(p) | PER NM 102(p) | STRT TM 103(p) | END TM 104(p) | DAY IDFR 105(p) | NO RINGS 106(p) |
|---|---|---|---|---|---|
| 100(p) | | | | | |

PROFILE DATABASE 41 (Cont)

*FIG. 4B*

SYSTEM AND METHOD FOR SCAN-DIALING TELEPHONE NUMBERS AND CLASSIFYING EQUIPMENT CONNECTED TO TELEPHONE LINES ASSOCIATED THEREWITH

FIELD OF THE INVENTION

The invention is generally related to the field of automatic telephone dialing and more particularly to computerized systems and methods for scan-dialing telephone numbers and classifying types of equipment which are connected to telephone lines with which the respective telephone numbers are associated.

BACKGROUND OF THE INVENTION

Scan-dialing of telephone numbers can be important in a number of environments for a number of purposes. For example, an organization may wish to determine, for each of the telephone numbers which it controls, the type or types of equipment, if any, that are connected to the telephone numbers which are associated with the lines. Numerous types of equipment may be connected to a telephone line, such as a voice telephone, an automatic voice answering system (such as an answering machine or a voice mail system), a fax machine, a data modem, and the like. In addition, several types of equipment may be connected to a single telephone line; for example, one line may be shared between a fax machine and a data modem through a switch that directs a call to one or the other based on information, such as tones or tone sequences, that are received from the caller. An organization may wish scan-dial and automatically detect types of equipment connected to telephone numbers which it maintains, for example, instead of trying to inventory the equipment manually, since equipment can be easily connected, disconnected and reconnected to other lines, which would render the inventory out of date. In addition, an organization may wish to scan-dial telephone numbers which it maintains in order to determine whether any of the telephone lines accessible using the respective are connected to equipment which is not authorized by the company or which is not secure pursuant to company policy. In addition, for computers which are connected to the telephone lines which an organization maintains, the organization may wish to ensure that passwords which may be required to access the computers through their dial-up connections are not such as would be easily guessed by an intruder.

SUMMARY OF THE INVENTION

The invention provides a new and improved system and method for scan-dialing telephone numbers and classifying types of equipment which are connected to telephone lines with which the respective telephone numbers are associated.

In brief summary, the invention provides a telephone scan-dialing arrangement that includes a listener module, at least one dialing control module and at least one dialing module, each dialing module being associated with a respective modem. The listener module receives a command to initiate a scan-dialing operation in connection with a profile that identifies, inter alia, telephone numbers to be dialed and operations to be performed during each call and telephone number selection criteria, and provides the identification of the profile to the dialing control module The dialing control module obtains from the profile a set of telephone numbers to be used during the scan-dialing operation and provides the obtained telephone numbers to respective ones of the dialer modules to be dialed for a call, along with information identifying operations to be performed during the call, as each dialer module finishes its previous call. During each call, each dialer module controls its associated modem to dial the telephone number provided thereto by the dialing control module and perform the specified operations. In addition, each dialer module stores call result information in the profile based on results of the call.

In embodiments of the invention, during each call the telephone scan-dialing arrangement can determine whether the called telephone line is busy, and whether the call is answered. In those embodiments, if the call is answered the dialer module can determine characteristics of equipment connected to the called telephone line, including whether the equipment is a voice answering equipment, such as a voice telephone or an automated voice answering system, a fax receiving device or a computer. If the answering equipment is an automated voice answering device or a computer, the telephone scan dialing arrangement can also attempt to gain access to, or penetrate, the device or computer to determine the operating system and user name/password combination used to access the device or computer.

In embodiments of the invention, a profile is stored in the form of SQL (structured query language) database, and the telephone scan-dialing arrangement can generate reports from the call result information in the profile using templates in HTML, RTF or other convenient format.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3, 4A and 4B are diagrams of data structures that are useful in understanding the operation of the system depicted in FIGS. 1 and 2.

DETAILED DESCRIPTION OF AN ILLUSTRATIVE EMBODIMENT

Figure 1:
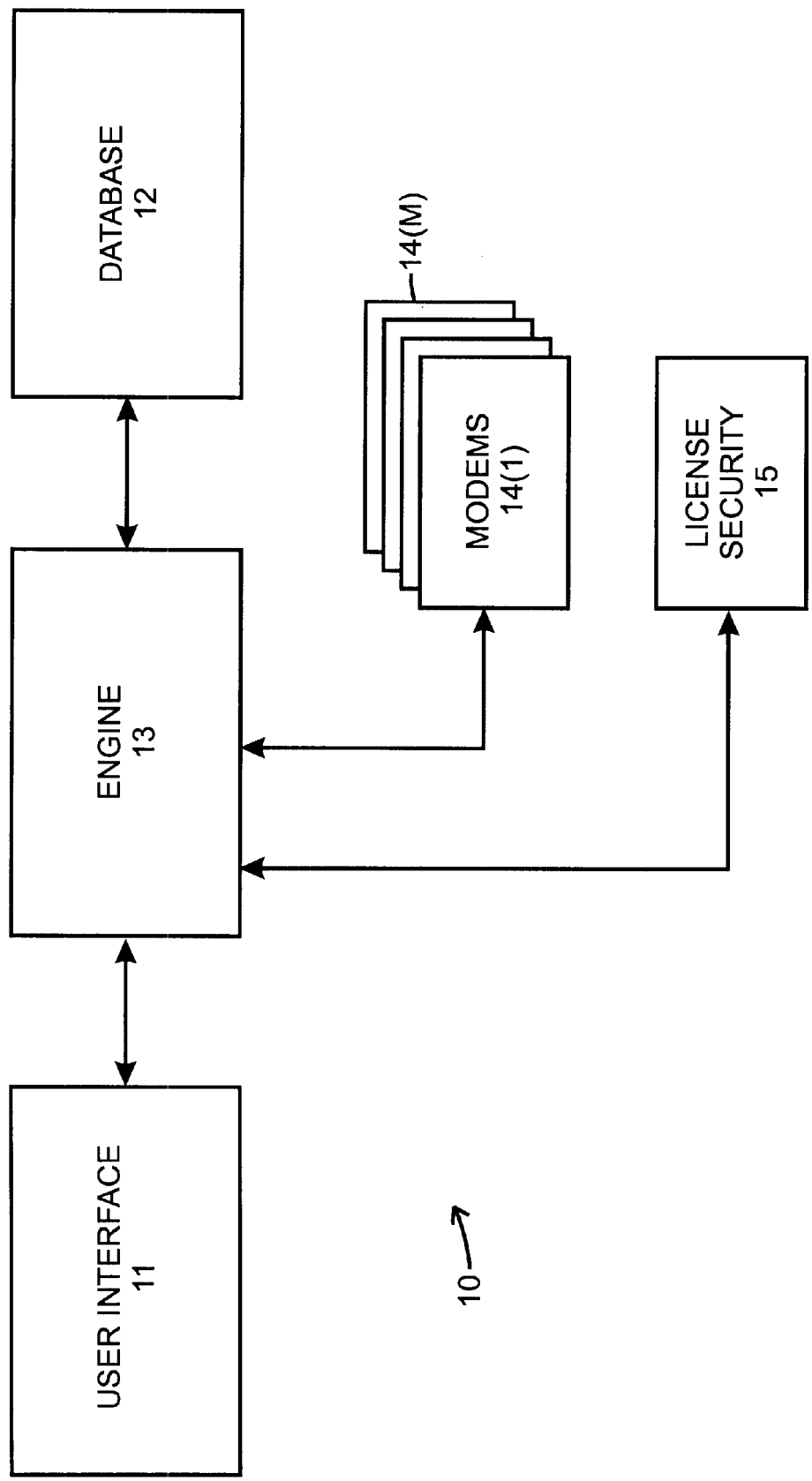
FIG. 1 is a general block diagram of an automatic telephone dialing and classification system constructed in accordance with the invention.

FIG. 1 is a general block diagram of an automatic telephone dialing and classification system 10 constructed in accordance with the invention. With reference to FIG. 1, system 10 includes a user interface 11, a database 12, one or more modems 14(1) through 14(M) (generally identified by reference numeral 14(m)) all controlled by an engine 13. Generally, the components depicted in FIG. 1 may comprise elements of a suitably programmed computer (not separately shown), such as a personal computer or computer workstation, with the user interface 11 including a video display device and the database 12 and engine 13 including processing and storage components provided in the computer. In such an embodiment, the engine 13 can receive commands to control operations thereby from an operator over operator input devices, such as a keyboard, mouse or the like (not separately shown) portion of the user interface 11, and can display results, as will be described below, on a video display device (also not separately shown) of the user interface 11. In one embodiment, the information displayed to the operator on the user interface 11 is displayed in the form of a window on a conventional graphical display, but it will be appreciated that any type of display, including, for example, a conventional text-based display.

It will be appreciated that, in such an embodiment (that is, in an embodiment in which the system 10 includes a suitably-programmed computer such as a personal computer or computer workstation), the modems 14(m) may be connected into the system 10 as expansion cards or the like. Any convenient number of modems 14(m) may be connected into the system 10, each modem 14(m) being capable of being connected to a respective analog telephone line. It will be appreciated that, instead or in addition to modems 14(m) the system 10 may include adapters for connection to digital telephone lines such as those for ISDN ("integrated services digital network"), DSL ("digital subscriber line") or the like. Generally, in the following, it will be assumed that "modem" generally includes all types of devices for connection to any form of telephone line, including analog telephone lines and digital telephone lines.

In addition, in one embodiment the system 10 includes a license security device 15, in the form of a "dongle" connected to, for example, a parallel port (not separately shown) of the computer to provide hardware licensing security for the program controlling the computer included in the system 10. In one embodiment, in which at least a portion of the system 10 is in the form of a programmed computer, with a portion of the computer program being encrypted. The license security device 15 contains a decryption key which is used to decrypt the encrypted portion when the program is booted, and the portion of the computer program that is encrypted is selected to ensure that the system 10 will not operate without the license security device 15 attached. The system 10 may also include other devices, such as a printer to provide hardcopy output, which are conventionally in or used in connection with a computer.

In accordance with the invention, the system 10 provides an arrangement for dialing of telephone numbers to classify the type or types of equipment that are connected to the respective telephone line. In that connection, the operator can provide a telephone number or a range of telephone number, and the system 10 will dial the numbers, and, for each number dialed, determine the types of equipment connected to telephone line associated with the number, including, for example, whether the equipment is a voice telephone, an automatic voice answering system such as an answering machine or voice mail system, a fax machine and/or a modem connected to a computer. The system 10 can determine whether the equipment connected to a dialed line is a voice telephone by determining whether a person answers and speaks into the telephone. In addition, the system 10 can determine whether the equipment connected to a dialed line is a fax machine or computer by monitoring the line for the conventional fax and/or modem data tones. Furthermore, since a telephone line can be shared among several types of devices, either directly or a switching arrangement, the system 10 can force a response from a particular type device by sending, for example, a fax tone to determine whether a fax machine is connected to the dialed line, and, perhaps in a separate call, a modem data tone to determine whether a modem is connected thereto which responds to a data call.

During dialing, the system 10 allows certain numbers or ranges of numbers within the range to be excluded from dialing, or that certain numbers or ranges be dialed only during certain time periods, such as during hours which are defined as business hours, evening hours, early morning hours or the like. In addition, the system 10 allows that telephone numbers be dialed sequentially, at random, or with certain dialing priorities. Furthermore, the system 10 allows that, after the system determines that one of a predetermined set of types of equipment are connected to a line, that it (that is, the system 10) can attempt to identify predetermined characteristics concerning the equipment. For example, if the system 10 determines that the equipment connected to a dialed line is a fax machine, it can determine the fax machines' transmit and receive characteristics, including, for example, the transmit/receive speeds, fax group standards it conforms to, and the like. On the other hand, if the system 10 determines that the equipment connected to a dialed line is a modem connected to a computer, it can attempt to determine the type of operating system controlling the computer and communication protocol used thereby. In addition, the system 10 can attempt to log onto the computer and, if necessary, determine one or more passwords which must be used to give entry to the computer.

The operator enables the information used by the system in controlling the above-described operations to be stored in the database 12. In addition, all of the information determined by the system 10 during its operations as described above is stored in the database 12 for later generation of reports for use by the operator.

Figure 2:
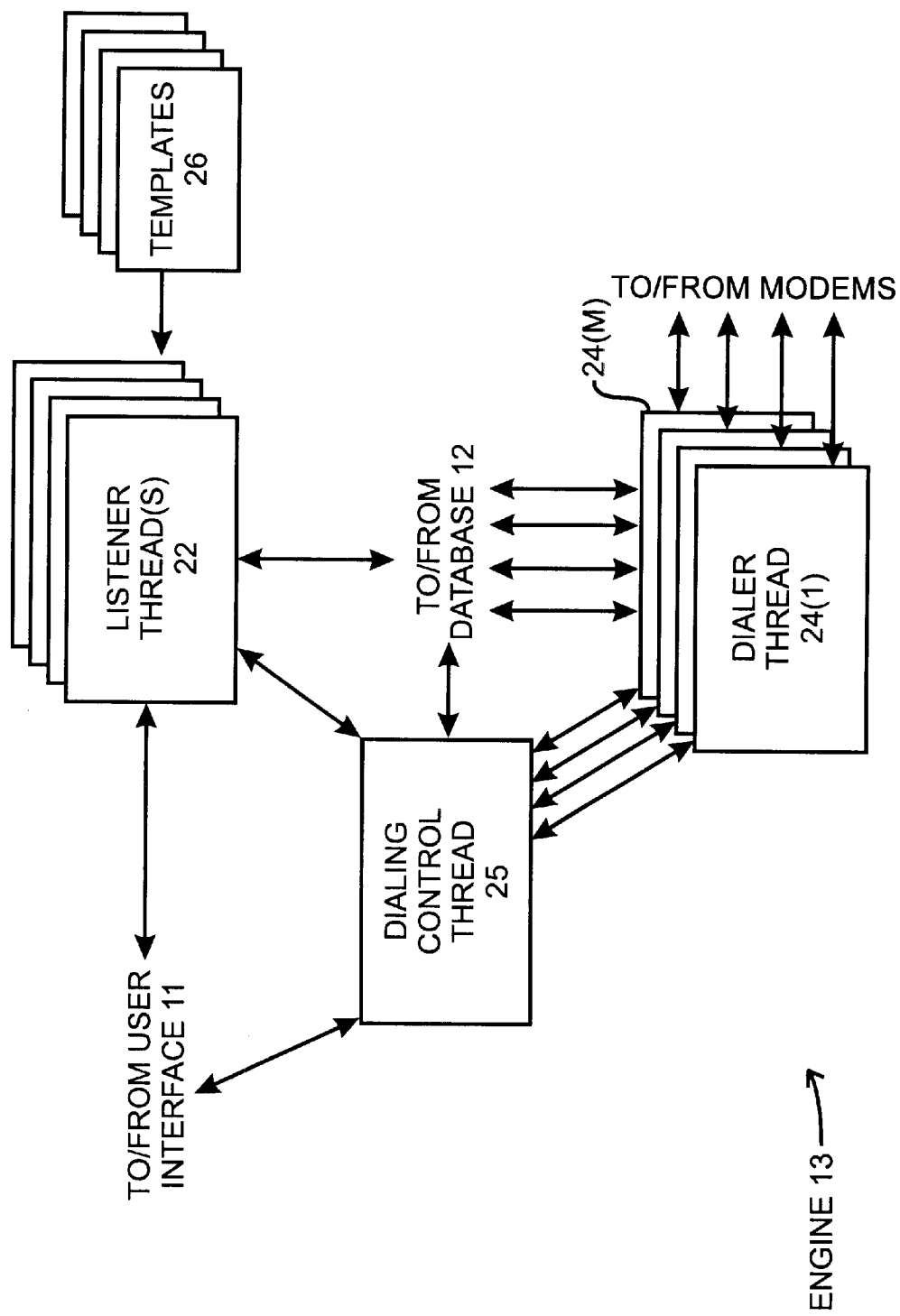
FIG. 2 is a functional block diagram of the system depicted in FIG. 1.

FIG. 2 depicts a functional block diagram of the engine 13 described above in connection with FIG. 1. With reference to FIG. 2, engine 13 includes a plurality of threads, including one or more listener threads 22, one or more dialer threads 24(1) through 24(M) (generally identified by reference numeral 24(m)), and a dialing control thread 25. The user interface thread 20 controls the user interface 11 (FIG. 1), including both user interface devices, such as a video display device, printer and the like, which display or otherwise provide information to the operator, as well as user interface devices, such as a keyboard, mouse and the like which an operator uses to provide information to the system 10. In particular, in connection with the video display device or printer, user interface thread 20 provides information to the user interface 11 for display to the operator, including processing information and reports as will be described below. In addition, the user interface thread 20 receives from the user interface 1 information provided by operator. Illustrative information which an operator may provide includes, for example, telephone number information comprising the identifications of the telephone numbers which are to be dialed. The telephone number information which may be provided, for example, as individual telephone numbers, one or more ranges of telephone numbers, and ranges with exclusions (that is, telephone numbers within a range which are not to be called). In addition, an operator can provide dialing order control information to control the order in which the telephone numbers are to be dialed, indicating, for example, whether the telephone numbers are to be dialed sequentially or at random and whether the telephone numbers are to be dialed once or more than once. In addition, the operator can provide dialing timing control information to control the timing with which the telephone numbers are to be dialed, that is, for example, the maximum number of calls per predetermined time period. Furthermore, the operator can provide operational mode information to control operations performed after a call is answered, and user name and password information to be used as described below. Using the user interface thread 11, the operator can also enable the other threads to be started. A set of the various types of information as described above will be referred to as a "profile." The operator can enable multiple profiles to be created and stored as databases in the database 12.

Generally, each listener thread 22 executes various commands entered by the operator through the user interface 11. In one embodiment, there are several types of commands that are executed by the listener thread 22, including, for example, control commands, profile maintenance commands and status and report generation commands. In response to control commands, the listener thread 22 starts and shuts down the dialing control thread 25. In one embodiment, the listener thread 22 can start multiple dialing control threads 25. If the listener thread 22 does start multiple dialing control threads, they may all be associated with and control overlapping or non-overlapping groups of the dialer threads 24(m).

In response to profile maintenance commands, the listener thread 22 enables profiles to be created and stored in the database 12, and enables previously-created profiles to be retrieved from the database 12 for display to the operator. After a previously-created profile has been displayed, the operator can verify the profile and, if necessary, update it, using the user interface 11, after which the updated profile can be stored in the database 12. In addition, profile maintenance commands executed by the listener thread 22 can enable a profile to be deleted from the database 12.

In response to status and report generation commands, the listener thread 22, through the user interface 11, provides information to the operator as to the status of the various elements of the system 10, including for example, the status of the dialing control thread 25 in its operations in connection with processing of a profile, operational status of the individual dialer threads 24(m) and modems 14(m), and so forth. In addition, generally after a dialing control thread 25 has processed a profile, the listener thread 22, using pre-defined report templates 26, can generate reports in various formats of results of processing of the profile, for display or printing. Each report template includes pre-defined textual material and variables for which the listener thread 22 can substitute specific items of information concerning results of calls from processing of a profile. After generating a report, the listener thread 22 can provide the report to the user interface thread 20 for display or printing. In one embodiment, templates 26 are provided in HTML (HyperText Markup Language) and RTF (Rich Text Format) formats, but it will be appreciated that templates may be provided in any format.

The dialing control thread 25, after being started by the user interface thread 20, determines from the dialing and timing control information in the database 12, the next telephone number to be dialed and when it is to be dialed. At the time the next telephone number is to be dialed, the dialing control thread 25 determines whether a dialer thread 24(m) is free, and, if so, selects that dialer thread 24(m) to perform the call. On the other hand, if no dialer thread 24(m) is free at the time the next telephone number is called, the dialing control thread 25 will wait until a dialer thread 24(m) becomes free, at which point it will select the free dialer thread 24(m) to perform the call. In response to being selected, the dialer thread will dial the telephone number and perform predetermined operations in connection therewith.

As noted above, each dialer thread 24(m) controls the correspondingly-indexed modem 14(m). In those operations, each dialer thread 24(m), after receiving a telephone number information from the dialing control thread 25, retrieves the operational mode information to be used in connection with the telephone number. After receiving the operational mode information, the dialer thread 24(m) enables the modem 14(m) to dial the telephone number provided and thereafter performs operations as determined by the operational mode information. In one embodiment, the dialer thread 24 can operate in three operational modes, namely, a "connect" mode, an "identify" mode and a "penetrate" mode. In the connect mode, the dialer thread 24(m) enables the modem 14(m) to dial a telephone number and determine whether a telephone line is assigned to the telephone number. If the dialer thread 24(m) determines that a telephone line is assigned to the telephone number, it (that is, the dialer thread 24(m)) can enable an indication therefor in the database 12. The dialer thread 24(m) determines that a telephone line is assigned to the telephone number by enabling the modem 14(m) to determine the manner in which the call is answered. That is, if the dialed telephone number is "not in service," that is, if no telephone line is assigned to the dialed telephone number, a recorded notification is typically provided by the telephone company, which the dialer thread 24(m) can receive from the modem 14(m) and enable to be stored in the database 12. If the dialed telephone number is in service, that is, if a telephone line is assigned to the dialed telephone number, the dialer thread 24(m) can enable an indication therefor to be stored in the database 12, and in addition can store an indication as to whether the call was answered within, for example, a selected number of rings or a predetermined maximum time interval after dialing. If the call is not answered within the selected number of rings or predetermined maximum time interval, which can occur if, for example, the telephone line is connected to a voice telephone which is not answered, the dialing control thread 25 may enable the telephone number to be dialed again at one or more a later times, as will be described below, until the call is answered, to verify that the telephone line is currently in service and being used. The dialing control thread 25 may enable the telephone number to be dialed up to a predetermined maximum number of unanswered calls have been placed using the telephone number, which may, but need not, indicate that nothing is connected to the line.

In the identify mode, a dialer thread 24(m) enables the associated modem 14(m) to dial and, if the equipment connected to the line associated with the telephone number answers in response to the call, determine the type of equipment, illustratively whether the equipment is a voice telephone, automated voice answering device such as an answering machine or voice mail system, a fax machine or modem, and thereafter hang up. If the equipment is a voice telephone, the dialer thread 24 can also record the oral response, if any, by the person who answers the phone, for storage in the database 12. If the dialer thread 24(m) determines that equipment connected to the called line includes an automated voice answering device, it can, using voice recognition or comparison to known samples, determine the prompts responses for which are required to gain entry to the automated voice answering device and check default or common passwords in response to attempt to gain entry. If the dialer thread 24(m) gains entry to an automated voice answering device it can attempt to determine characteristics of the device, such as the maximum length of messages that may be left and also the capacity of the device, that is, the amount of message recording time provide by the device or number of messages that may be left on the device.

Further in the identify mode, the dialer thread 24(m) can determine whether the equipment connected to the telephone line is a fax machine or a modem set to receive a data call in relation to the characteristic tones emitted thereby. The dialer thread 24(*m*) can determine whether the dialed telephone number is not in service in the same manner as described above, and enable the recorded notification provided by the telephone company to be stored in the database 12 along with the telephone number that was called.

Operations performed by a dialer thread 24(*m*) in the penetrate mode include those described above in connection with the connect and identify modes, and in addition, if the equipment connected to the called telephone line is a modem set to receive a data call, attempts to penetrate the computer connected thereto. In those operations, the dialer thread 24(*m*) attempts to identify the operating system that is controlling the computer and the communications protocol used thereby by identifying various characteristics of the bit stream that is transmitted by the computer and received by the modem 14(*m*). In addition, the dialer thread 24(*m*) attempts to actually penetrate the computer by enabling the associated modem 14(*m*) to provide various combinations of user names and passwords. If the dialer thread 24(*m*) is able to penetrate the computer using a particular user name and password combination, it will also enable that information (that is, the user name/password combination) to be stored in the database 12 along with the telephone number that was called. The user names and passwords that the dialer thread 24(*m*) will use in the penetrate mode are provided by the operator and stored in the database 12. In addition, the operator can, by storing appropriate information in the database 12, control the number of user name/password combinations that will be used by the dialer thread 24(*m*) during a call, since typically a computer will enable its modem to terminate a call after receiving a predetermined number of invalid user name/password combinations. As will be described below in greater detail, the dialer control thread 25 can control the user name/password combinations used by the various dialer threads 24(*m*) in various modes. Illustratively, the control thread 25 can enable all of the dialer threads 24(*m*) to try all of the user name/password combinations or selected ones or ranges of user name/ combinations, in random order, in an order based on the order in which the telephone numbers are sorted, or other order that will be apparent to those skilled in the art.

The dialing control thread 25 and dialer threads 24(*m*) make use of several data structures in performing operations as described above. Generally, operations performed by the dialer threads 24(*m*) in the connect and identify modes are controlled by scripts. Operations performed by the dialer threads 24(*m*) during connect and identification portions of the penetrate mode are also controlled by scripts; however, the operations performed by the dialer threads 24(*m*) following the connect and identification portions of the penetrate mode to identify the operating system, attempt to penetrate and other predetermined operations are determined by a function/state table, an illustrative one of which is depicted in FIG. 3 and identified by reference numeral 30. With reference to FIG. 3, function/state table 30 includes a plurality of entries 31(1) through 31(S) (generally identified by reference numeral 31(*s*)) each of which is associated with a state. As will be described below, a plurality of entries 31(*s*) may be associated with the same state. Each entry 31(*s*), in turn, includes a plurality of fields, namely, a state field 32(*s*), a match string field 33(*s*), a function to call field 34(*s*), a next state field 35(*s*), a system identifier string field 36(*s*) and a match confidence field 37(*s*). The state field 32(*s*) contains a state identifier that identifies the current state of the dialer thread 24(*m*) that is using the function/state table 30. The match string field 33(*s*) contains a value in the form of a text string. The function to call field 34(*s*) contains a function identifier, which identifies one of a plurality of operations which can be performed by the dialer thread 24(*m*). The system identifier field 36(*s*) may contain a system identifier value which identifies a particular operating system, and, if so, the match confidence field 37(*s*) contains a value identifying the confidence that the operating system identified in the system identifier field 36(*s*) will actually correspond to the operating system controlling the computer connected to the called telephone line. If (i) the dialer thread 24(*m*) is currently in the state identified in the state field 32(*s*) and (ii) a signals are received by the modem 14(*m*) from the computer connected to the called line define a text string that corresponds to the contents of the match string field 33(*s*), the dialer thread 24(*m*) will call the function identified in the function to call field 34(*s*) and perform the operation enabled thereby. Thereafter, the dialer thread 24(*m*) will sequence to the next state. These operations can be repeated through a plurality of iterations as the dialer thread 24(*m*) attempts to penetrate the computer.

As noted above, each state may be associated with several entries 31(*s*) of the function state table 30. This will accommodate the fact that, a computer which may be connected to a called telephone line may transmit signals defining different types of text strings at the same point in the penetrate operation, that is, while the dialer thread 24(*m*) is in a particular state, with the specific text string depending on the operating system and other characteristics of the computer. Thus, separate entries 31(*s*) will be provided in the function/ state table 30 for each state for each of the possible strings which the dialer thread 24(*m*) may receive.

In addition, the text string specified in the match string field 33(*s*) of an entry 31(*s*) may define the actual text string to be compared with the text string received from the computer connected to the dialed line. Alternatively, the text string may define a pattern or a regular expression, which may include wildcards, which is to be compared with the text string.

As an illustrative example of the use of the function/state table 30 by the dialer threads 24(*m*), the various states which may be identified in the state field 32(*s*) and next state field 35(*s*) may include, for example, a "connect" state, a "send user name" state, a "send password state" and a "hang up" state. If a dialer thread 24(*m*), operating in the penetrate mode, is in the connect state, and if the modem 14(*m*) receives signals defining a predetermined text string, as indicated in the match string field 33(*s*') of one of the entries, namely, entry 31(*s*') associated with the connect state, it will call and perform the function identified in the function to call field 34(*s*'). If the function identified in the function to call field 34(*s*') is, for example, to enable the transmission of a signal representing a carriage return, the dialer thread 24(*m*) enables the modem 14(*m*) to transmit such a signal. In addition, if the state identified in the next state field 35(*s*') is the send user name state, it will sequence to that state. Similarly, if the dialer thread 24(*m*) is in the send user name state, and if the modem 14(*m*) receives signals defining a predetermined text string, as indicated in the match string field of one of the entries, namely, entry 31(*s*") that is associated with the send user name state, it will call and perform the function identified in the function to call field 34(*s*") of that entry 32(*s*"). If the function identified in the function to call field 34(*s*") is, for example, to enable transmission of a signal representing a user name, the dialer thread 34(*m*) will enable the modem 14(*m*) to transmit the signal representing the user name. In addition, if the state identified in the next state field 35(*s*") of the entry 31(*s*") is the send password state, it will sequence to that state. These operations will continue through a series of states and a corresponding series of entries 31(s) until the penetrate operation is completed.

As noted above, the dialing control thread 25 and dialing threads 24(m) make use of profiles which are stored as one or more profile databases in database 12. The profile databases contain information which are used by the dialing control thread and dialing threads 24(m) in connection with calls. The structure of a profile database will be described in connection with FIGS. 4A and 4B. With reference to FIG. 4, the profile database 41 comprises a plurality of tables, including a phone numbers table 42, a call history table 43, dialing profile table 44, a user names/passwords table 45, a call detail table 46 and a time periods table 47 (FIG.4A). In one embodiment, the profile database 41 is in the form of an SQL (structured query language) database stored in database 12. The generally, the phone numbers table 42 stores information such as the telephone numbers and time periods during which the respective telephone numbers can be called during a session or "run." The call history table 43 provides additional information for each call, including the number called, the time at which the call started, the modem 14(m) that was used to make the call, the time required for the equipment, if any, connected to the called line to connect, and the length of the call. The user names/passwords table 45 contains a list of user names and passwords which can be used during a penetrate operation. The call detail table 46 contains, for each call, the actual text defined by the signals transmitted and receives by the respective modem 14(m). Finally, the time periods table 47 defines respective time periods and the number of times and/or a period of time that a modem 14(m) should allow a call to ring before hanging up if the call is not answered, and a text name for the respective time period. The time periods table 47 allows different numbers of rings to be used for different time periods.

More specifically, and with reference to FIG. 4, the phone numbers table 42 includes a plurality of entries 51(n) each of which includes a number identifier field 52(n), a phone number field 53(n), a time periods field 54(n), a no call field 55(n), several call type control flags including a modem call flag 56(n), a fax call flag 57(n), and a penetrate enable flag 58(n), a penetrate count field 59(n), a busy count field 60(n), a calls today count field 61(n), a total calls count field 62(n) and a last called field 63(n). The number identifier field 52(n) contains a unique identifier value for the entry 51(n) that identifies the entry. The phone number field 53(n), contains a telephone number that may be called when the profile is run.

The time periods field 54(n) and the no call field 55(n) of each entry 51(n) in the phone numbers table contain values that jointly determine, along with the particular time of day or day of the week at which the profile is being executed, whether the telephone number in phone number entry will actually be called. In particular, the time periods field contains one or more identifiers which identify particular time periods, as defined in the time periods table 47, which identify one or more time periods during which the telephone number in the phone number field 53(n), may be called. The no call field 55(n) contains a value that indicates whether the telephone number in the phone number field is to be called, regardless of the time periods mentioned in the time periods field 54(n). In one embodiment, there are several possible values that are contained in the no call field 55(n), including a value indicating that the telephone number may be called, a value indicating that the telephone number has been deleted, a value indicating that the telephone number is currently excluded from being called, and a value indicating that the telephone number is not to be called for, for example, the rest of the day or week. The last value, that is, the value which may be provided in the no call field 55(n) indicating that the telephone number is not to be called for the rest of the day or week may be controlled by the operator or the dialing control thread 25 to limit the number of calls using the entry 51(n), and may be inserted into the no calls field 55(n) if the number of calls within the time period (day or week) exceeds a selected threshold; at the end of the time period, the contents of the no calls fields 55(n) of the various entries 51(n) which are set to that value can be returned to the value indicating that the telephone number may be called. The modem call flag 56(n), the fax call flag 57(n) and the penetrate enable flag 58(n) control the type or types of calls that can be made to the telephone number identified in the phone number field 53(n). If the modem call flag 56(n) is set, a modem data call may be made using the entry 51(n). Similarly, if the fax call flag 57(n) is set a fax call may be made using the entry 51(n), and if the penetrate enable flag 58(n) is set a modem data call may be made using the entry 51(n) in the penetrate mode as described above. The penetrate count field 59(n) provides a count field identifying the number of times penetrate operations were attempted using the entry 51(n). The busy count field 60(n) identifies the number of times calls using the entry 51(n) were made in which the line was busy. The calls today field 61(n) contains a value that identifies the total number of calls that made using the entry 51(n) for the day, and the calls total field 62(n) contains a value that identifies the total number of calls made using the entry 51(n); it will be appreciated that the contents of the calls today field 61(n) will be reset on a daily basis. The last called field 63(n) contains a value that indicates the date and time on which the most recent call was placed using the entry 51(n) for which the telephone line was not busy.

It will be appreciated that multiple entries 51(n) can have the same telephone number in phone number field 53(n),. This may be useful if, for example, it is desired to have different calling patterns as controlled by the values in the time periods field 54(n) and no call field 55(n). It will also be appreciated that, instead of marking an entry 51(n) as deleted in the no call field, the entry may be simply deleted.

As indicated above, an operator can provide telephone numbers to be called as a list of telephone numbers, as a range of numbers and as a range of numbers with some exclusions. In establishing the profile database 41 for the associated profile, the listener thread 22 will establish one entry 51(n) in the phone number table 42 for each telephone number in the list or range. For telephone numbers in the range which the operator specifies as being excluded, the listener thread can also establish entries therefor, providing in the no call field 55(n) a value indicating that the telephone number is excluded from being called.

The call history table 43 stores call information for each call made during each run for the profile associated with the profile database 41. The call history table includes a plurality of entries 65(c), each of which is associated with one of the calls. Each entry 65(c), in turn, contains a plurality of fields, including a call identifier field 66(c), a called number identifier field 67(c), a phone number field 68(c) a start time field 69(c), a time to connect field 70(c), a call time field 71(c), a modem identifier field 72(c), a run field 73(c), a fax call flag 74(c), a call result field 75(c), a user name field 76(c), a password field 77(c), a system identifier field 78(c) and a penetrate result field 79(c). The dialer threads 24(m)

can establish the respective entries 65(c) and provide information for the respective fields as and after they make respective calls. The call identifier field 66(c) uniquely identifies the call for the entry 65(c) and the run field 73(c) identifies the run during which the particular call was made. The called number identifier field 67(c) contains a value that identifies the entry 51(n) from which the telephone number was obtained to make the call, and the phone number field 69(c) is provided to receive a value corresponding to the telephone number that was used in making the call associated with the entry 65(c). The telephone number is stored in phone number field 69(c) in the event that the entry 51(n) whose telephone number was called is deleted from the phone numbers table 42. The start time field 69(c) contains a value that identifies the time the call was started, the time to connect field 70(c) contains a value that identifies the amount of time between the time that the modem 14(m) making the call finished dialing and the equipment connected to the called line connects, and the call time field 71(c) contains a value that identifies the length of the call between the time the equipment connected to the called line connects and the call is terminated. The modem identifier field 72(c) contains a value that identifies the particular modem 14(m) that made the call associated with entry 65(c). The fax call flag 74(c) in the entry 65(c) of the call history table will be set if the telephone call associated with the entry 65(c) is a fax call. The call result field 75(c) is provided with a value that indicates whether the call resulted in a connection. If a penetrate operation was performed in connection with the telephone call associated with entry 65(c), the user name field 76(c) and password field 77(c) will contain values that identify the user name(s) and password (s) that were used during the penetrate operation, the system identifier field 78(c) will identify the operating system, if any, identified during the penetrate operation, and the penetrate result field 79(c) will contain a value which indicates whether or not the penetrate operation was successful. If multiple user names and passwords are used during a call, they may all be stored in the respective fields 76(c) and 77(c) of the same entry 65(c), and respective penetrate results stored in the penetrate result field 79(c), or separate entries 65(c), 65(c'), . . . , may be provided and pointers linking the entries may be provided in other fields (not shown) of the respective entries. Preferably, the actual user names and passwords will be stored in fields 76(c) and 77(c) of the call history table, instead of indices into the user name/password table 45 in the event that the user names and passwords in the table are subsequently changed.

The dialing profile table 44 contains global information to be used for the profile associated with profile database 41. The dialing profile table 44 contains one or more entries 85(d), each of which contains a profile variable identifier field 86(d) and a profile variable value field 87(d). In one particular embodiment, the dialing profile table 44 contains various types information, including, for example, (i) modem information, identifying the number and ports for modems which may be used in dialing for the profile, modem control information including initialization strings and so forth, (ii) call control information, identifying the beginning and end of black-out periods, during which no calls will be made using the profile regardless of time period information which may be provided elsewhere in the profile database 41, dialing prefixes and suffixes, the maximum number of calls per day and total for each entry 51(n), the maximum number of redials for busy telephone numbers, the maximum number of penetration operations to be performed for each entry 51(n), the maximum number of times a particular user name or password is to be used and the like, and (iii) report generation control information, which controls how reports are to be generated and the information to be contained therein for the profile.

It will be appreciated that other types of global information may also be provided in the dialing profile table 44.

The call detail table 46 stores detailed call information for each of the calls for which information is provided in the call history table 43. The call detail table 46 includes a plurality of entries 90(c), each of which is associated with one of the entries 65(c) in the call history table. Each entry 90(c), in turn, includes a plurality of fields, including a call identifier field 65(c), a sent text field 92(c), a received text field 93(c) and a notes field 94(c). The call identifier field 65(c) contains a call identifier value, which will correspond to the contents of the call identifier field 66(c) of one of the entries 65(c) in the call history table 43. The sent text field 92(c) and received text field 93(c) contain copies of the actual text, if any, that is representative of the signals that are sent and received, respectively, during a call by the modem 14(m) to equipment which responds to the call. The notes text field 94(c) contains text of notes entered by the operator for the call. If no equipment responds to a call, no entry 90(c) need be established for the call.

The time periods table 47 (see FIG. 4A) defines respective time periods and the time a modem 14(m) should allow a call to ring before hanging up if the call is not answered. The time periods table 47 includes one or more entries 100(p), each of which is associated with one time period definition. Each entry, in turn, includes a plurality of fields, including a period identifier field 101(p), a period name field 102(p), a start time field 103(p), an end time field 104(p), a day identifier field 105(p) and a number of rings field 106(p). The period identifier field 101(p) of the entry 100(p) includes a time period identifier value. Each time period identifier value in the time periods field 53(n), of each entries of the phone numbers table 42 (FIG. 4) corresponds to the period identifier value in field 101(p) of one of the entries 100(p) to identify that entry as containing the (if one time period identifier value is contained in time periods field 54(n)) or a (if multiple time period identifier values are contained in the time periods field 54(n)) time period definition to be used with the entry 51(n). The period name field 102(p) contains a "user friendly" name for the time period, which may be provided by the operator when the time period definition in the entry 100(p) is established and displayed to the operator when he or she is reviewing the time period definition(s) in the table 47. Illustrative time period names may be, for example, "Business Day," "Weekday Evening," "Weekend Day," Weekend Evening" and the like.

The start time field 103(p) and end time field 104(p) of entry 100(p) contain, respectively, values identifying the daily start and end times for the period and the day identifier field 105(p) contains a value identifying the day or days for which the time period definition is valid. For example, for an entry 100(p) for a time period definition for a time period whose name is "Business Day," start time and end time fields 103(p) and 104(p), contain values representing 9:00AM and 5:00PM, respectively, and the day identifier field 105(p) may contain one or more values identifying the days Monday through Friday.

The number of rings field 106(p) of the time periods table 47 contains a value that identifies the ring time for calls using the time period definition associated with the entry 100($p$). The ring time may be expressed in, for example, actual numbers of rings and/or a time period following completion of dialing, or any other convenient measure. Thus, different ring times may be enabled for different time period definitions. For example, for a "Business Day" time period definition, the maximum ring times might be, for example, as few as two rings since most fax machines and computers will connect on the first or second ring and, if the called line is a voice line, typically the person who might be answering the telephone is proximate the telephone. On the other hand, for other time period definitions, the maximum number of rings may be higher since, if the called line is a voice line, the person who might be answering the telephone will likely not be near the telephone.

It will be appreciated that the time periods table 47 may contain two or more entries with the same user friendly name in field 102($p$), but which identify, for example, different starting or ending times (fields 103($p$) and 104($p$)), different identified days (field 105($p$)) and/or different numbers of rings (106($p$)). The period identifier value in field 101($p$) of each entry 100($p$) will, however, be unique in the table 47. This can allow calls to telephone numbers associated with the diverse entries 51($n$) of the phone numbers table 42 to, for example, use diverse overlapping time periods and numbers of rings.

Finally, the user names/passwords table 45 contains user names and passwords that may be used by the system in connection with an attempt to penetrate a computer system connected to a called telephone line during a penetrate operation. The user names/passwords table 45 includes a plurality of entries 80($u$) each associated with one user name/password combination which may be used during a penetrate operation for the profile associated with profile database 41. Each entry 80($u$), in turn, includes a plurality of fields, including a user name/password combination identifier field 81($u$), a user name field 82($u$) and a password field 83($n$). The user name/password identifier combination field 81($u$) contains a unique identifier value that identifies the entry 80($u$). The user name field 82($u$) contains a user name value representative of a user name that can be transmitted to a computer system during a penetrate operation to attempt to penetrate the computer system as described above. Similarly, the password field 83($u$) contains a password value representative of a password that can be transmitted to a computer system during a penetrate operation to attempt to penetrate the computer system as described above. The contents of the user name and password fields 82($u$) and 83($u$) of the various entries 80($u$) may be provided by the operator. Generally, but not always, during a penetrate operation, both a user name and a password will need to be transmitted to the computer system to be penetrated. In that case, the user name/password combination that is transmitted may come from the same entry 80($u$), or they may come from different entries 80($u$). In addition, during a penetrate operation, the entries 80($u$) may be accessed to provide user names and passwords sequentially or at random.

Figure 5A:
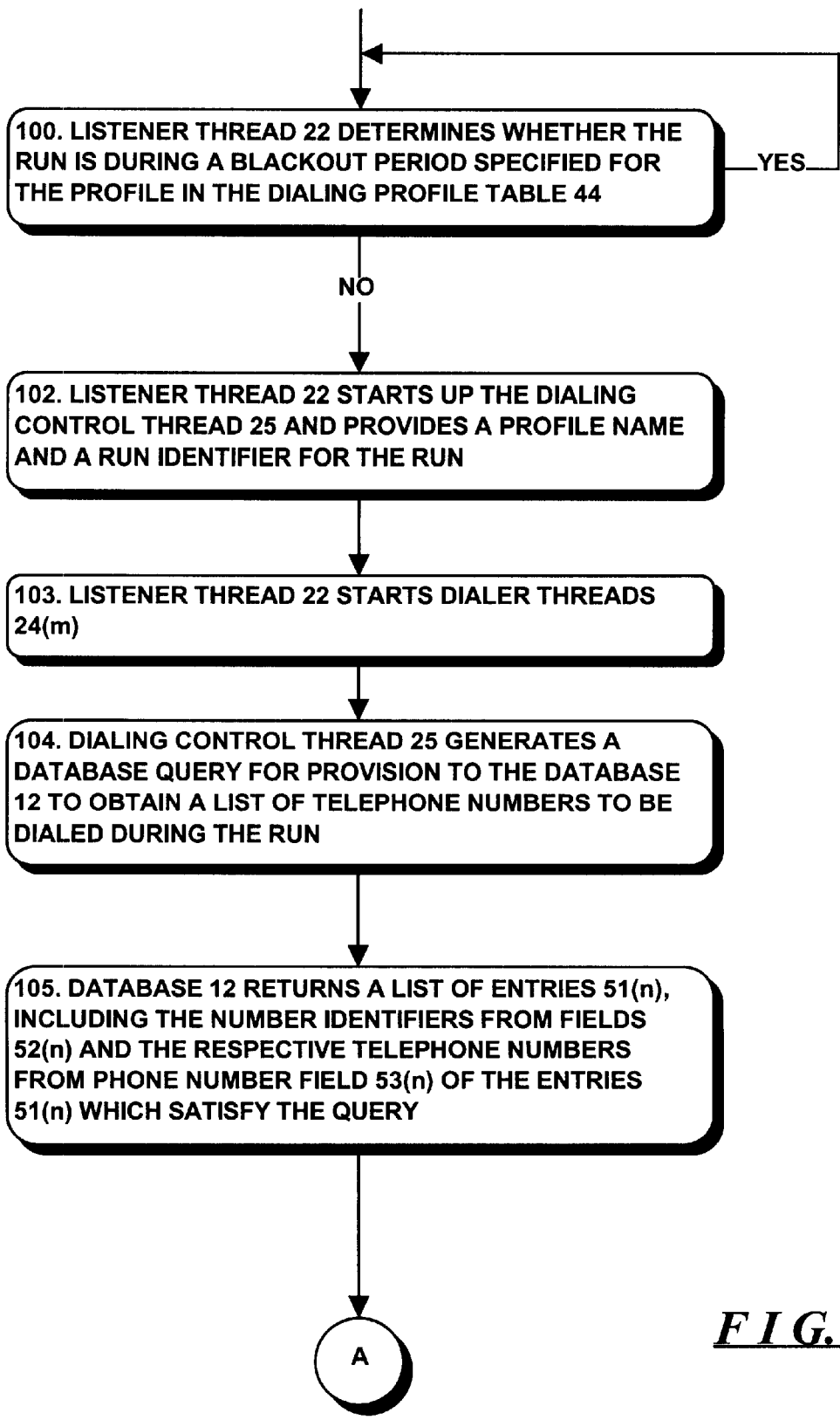
FIGS. 5A through 5C and 6A through 6D are flow charts illustrating operations performed by components of the system depicted in FIGS. 1 and 2.
Figure 5B:
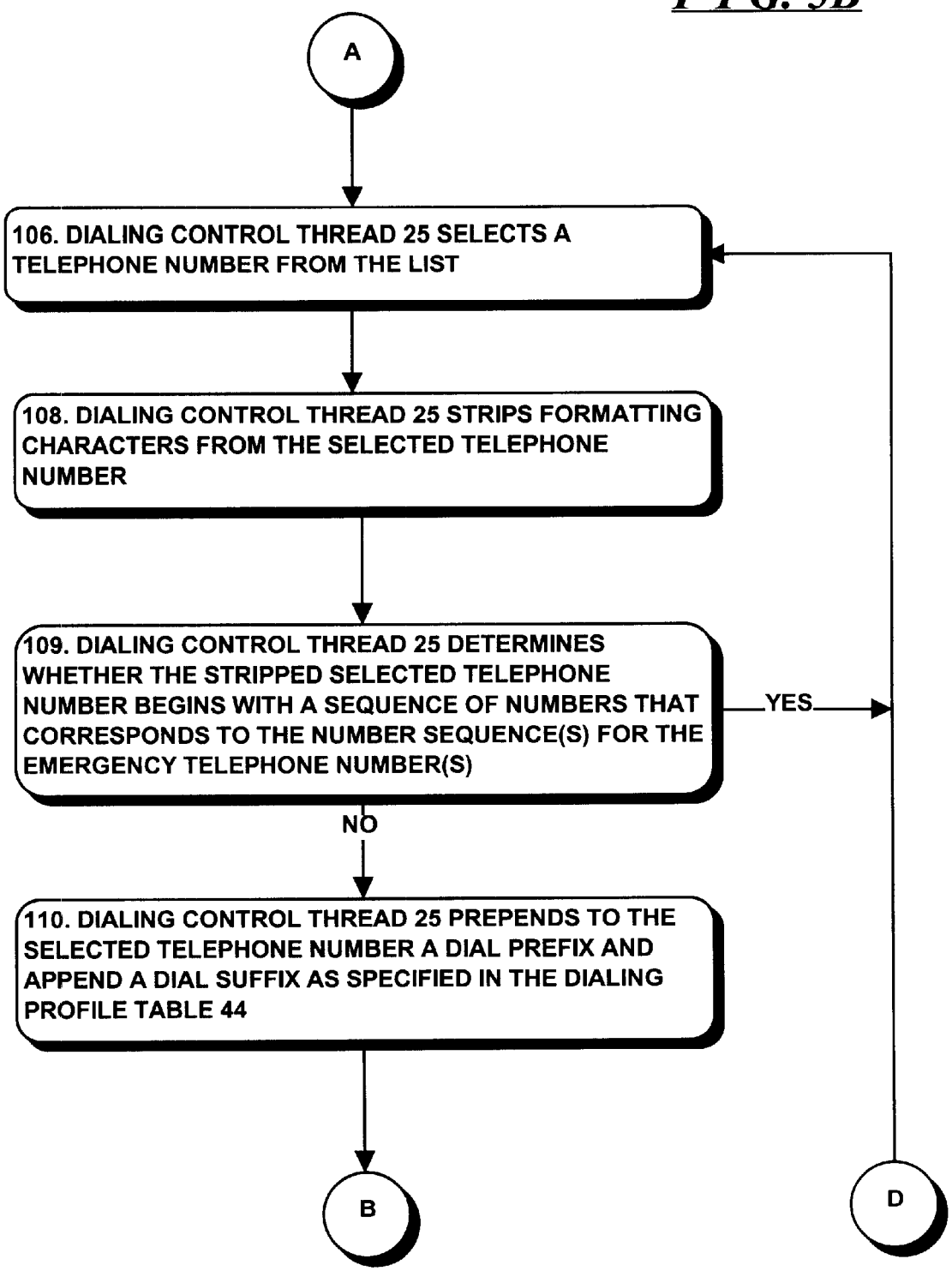
Figure 5C:
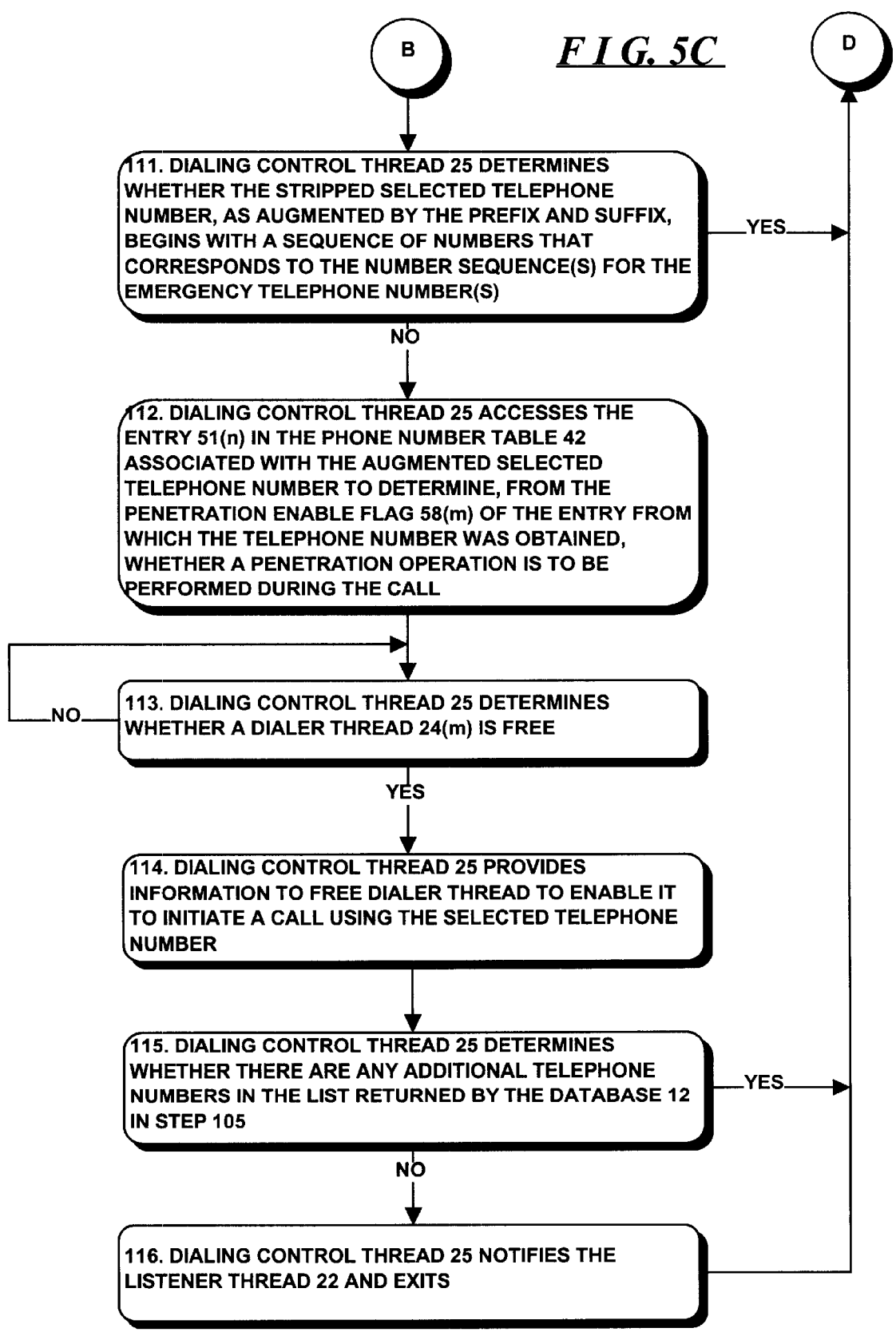

Operations performed by the engine 13, in particular by the dialing control thread 25 and a dialer thread 24($m$) during a run will be described in connection with the flowcharts depicted in FIGS. 5A through 5C and 6A through 6D, respectively. With reference to FIG. 5A, initially a listener thread 22 will determine whether the run is not during a blackout period specified for the profile in the dialing profile table 44 (step 100). If the listener thread 22 determines in step 100 that the run is during a blackout period, will wait in step 100 until the blackout period is over. If the listener thread 22 determines in step 100 that the run is not during a blackout period, it can start up the dialing control thread 25 and provides a profile name and a run identifier for the run (step 102). The identification of the profile to be used and the run identifier can be provided to the listener thread 22 by, for example, an operator through the user interface 11 and user interface thread 20. If the number of dialer thread or threads 24($m$) that are to be used by the dialing control thread 25 during the session, which number may also be indicated by the operator, are not already started the listener thread 22 can also start the necessary dialer threads 24($m$) (step 103).

After the dialing control thread 25 has been started and provided with the identification of the profile to be used during the run, it (that is, the dialing control thread 25) generates a database query for provision to the database 12 to obtain a list of telephone numbers to be dialed during the run (step 104). In one embodiment, the query can be based on values contained in, for example, the time periods fields 54($n$) (for example, the query can identify the current time period or the time period during which the run will be performed), the no call fields 55($n$) (to specify that only telephone numbers from non-excluded and non-deleted entries 51($n$) be provided), the busy count field 60($n$) (to specify that only telephone numbers from entries for which the number of busy calls is below or above a threshold selected by the dialing control thread for the run), the calls today fields 61($n$) and calls total fields 62($n$) (to specify that only telephone numbers from entries for which the number of calls today or in total are below predetermined thresholds as specified in the dialing profile table 44), and the last call field 63($n$) (to specify that only telephone numbers from entries for which the telephone numbers have been not been called within a predetermined period of time). After receiving the query, the database 12 will return a list of entries 51($n$), including number identifiers from fields 52($n$) and the respective telephone numbers from phone number field 53($n$), of the entries 51($n$) which satisfy the query (step 105).

After receiving the list of number identifiers and respective telephone numbers, the dialing control thread 25 proceeds to select telephone numbers from list and enable the dialing threads 24($m$) to perform the respective calls. The order in which the dialing control thread 25 selects telephone numbers from entries 51($n$) in the phone numbers table can also be selected by, for example, the operator when he or she starts the session. In one embodiment, the operator can specify that the dialing control thread 25 select entries, for example, sequentially, every second or third entry (in which case the dialing control thread 25 can sequence through the phone numbers table 42 twice, thrice, and so forth, so that all of the entries are selected), at random and the like.

After the dialing control thread 25 selects a telephone number from the list (step 106), it performs a series of steps to determine whether the telephone number is for one of the telephone numbers which is used for reporting and requesting assistance for medical, police, fire or similar emergencies (generally, an "emergency number"), such as "911" commonly used in the United States. If the selected telephone number is an emergency number, it may be desired to not enable that selected telephone number to be used in connection with a call. In those steps, the dialing control thread will determine whether the telephone number is an emergency number and if so skip the telephone number. In those steps, the dialing control thread 25 will initially strip any formatting characters from the selected telephone number (step 108). Formatting characters in a telephone number comprise any non-numeric characters which may be provided in a telephone number, such as those representing the hyphens and parentheses that are commonly used in connection with a telephone number. In addition, the dialing control thread checks for numbers that are not part of a telephone number, such as "*70", which may be dialed to signal the telephone system to provide various types of services. Thereafter, the dialing control thread 25 determines whether the stripped selected telephone number begins with a sequence of numbers that corresponds to the number sequence(s) for the emergency telephone number(s) (step 109). If the dialing control thread 25 makes a positive determination in step 109, it will not enable the selected telephone number to be dialed, but instead will return to step 106 to select another telephone number. On the other hand, if the dialing control thread 25 makes a negative determination in step 109, it will proceed to prepend to the selected telephone number a dial prefix and append a dial suffix as specified in the dialing profile table 44 (step 110) and again determine whether the stripped selected telephone number, as augmented by the prefix and suffix, begins with a sequence of numbers that corresponds to the number sequence(s) for the emergency telephone number(s) (step 111). If the dialing control thread 25 makes a positive determination in step 111, it will not enable the selected telephone number to be dialed, but instead will return to step 106 to select another telephone number.

However, if the dialing control thread 25 makes a negative determination in step 111, it can proceed to enable the augmented selected telephone number to be used in connection with a call. Initially in that connection, the dialing control thread 25 can access the entry 51($n$) in the phone number table 42 associated with the augmented selected telephone number to determine, from the penetration enable flag 58($m$) of the entry from which the telephone number was obtained, whether a penetration operation is to be performed during the call (step 112). Following step 112, the dialing control thread 25 will determine whether a dialer thread 24($m$) is free (step 113) and, if so, provides information to the free dialer thread 24($m$), including, for example, the number identifier value and phone number from the selected entry 51($n$), the run identifier, the ring time to be used, and whether a penetration operation is to be performed if the equipment that answers the call is a computer system (step 114). Following step 114, the dialing control thread 25 will determine whether there are any additional telephone numbers in the list returned by the database 12 in step 105 (step 115) and if so, returns to step 106 to select another telephone number from the list and perform steps 106 through 115 in connection therewith. The dialing control thread 25 will perform steps 106 through 115 until it determines, in step 115, that there are no further telephone numbers in the list, at which point it can notify the listener thread 22 and exit (step 116).

Figure 6A:
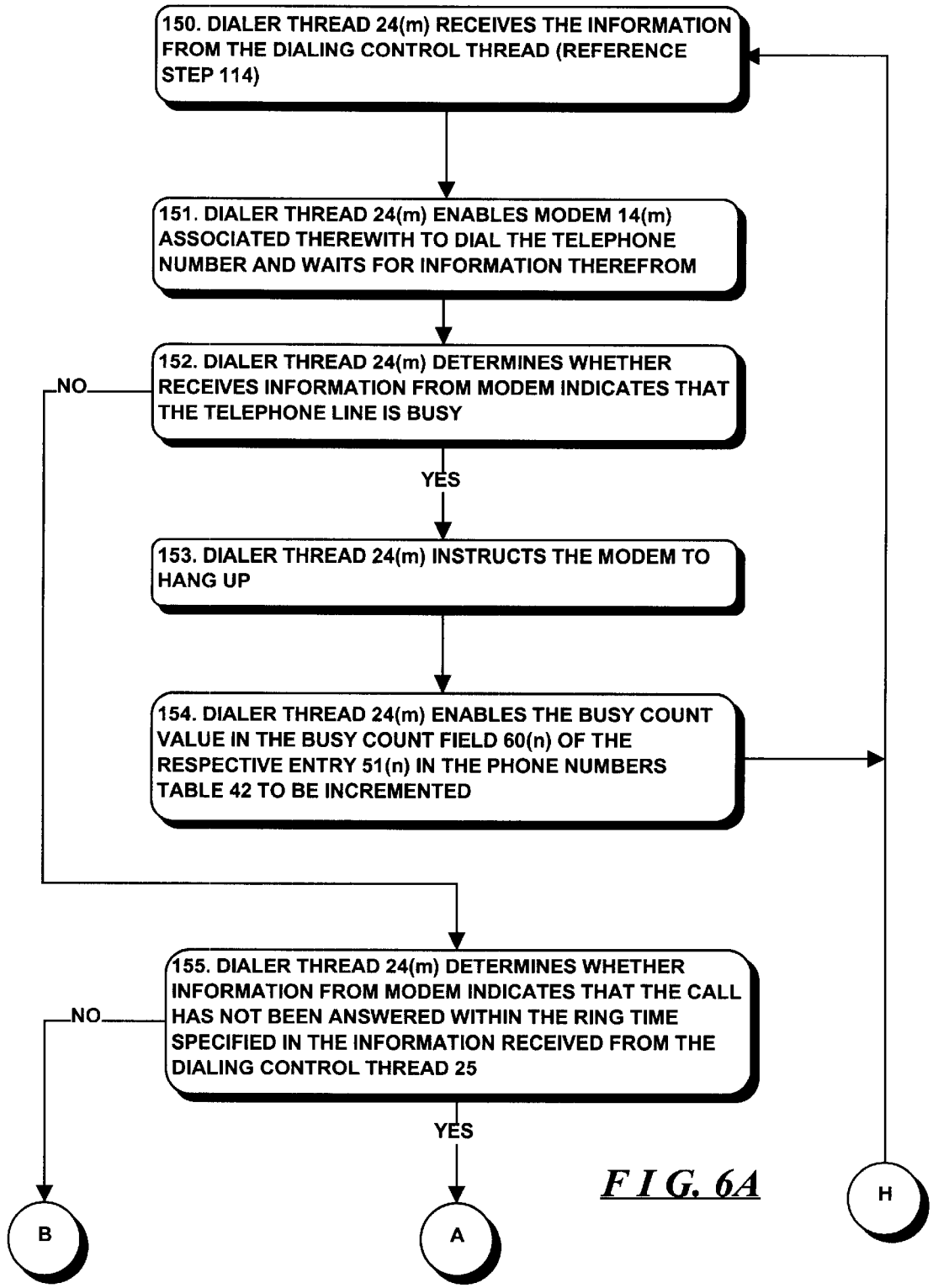
Figure 6B:
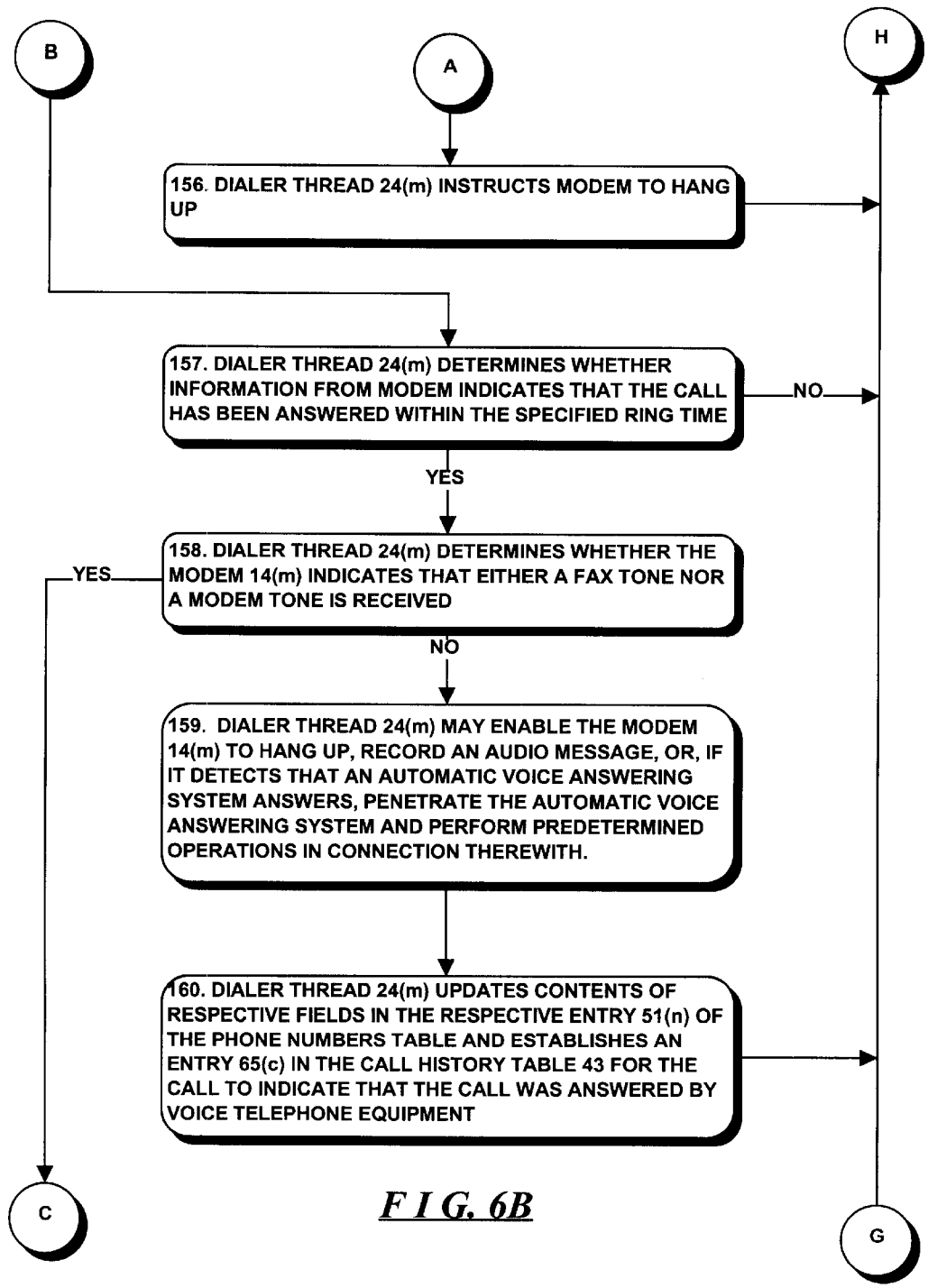
Figure 6C:
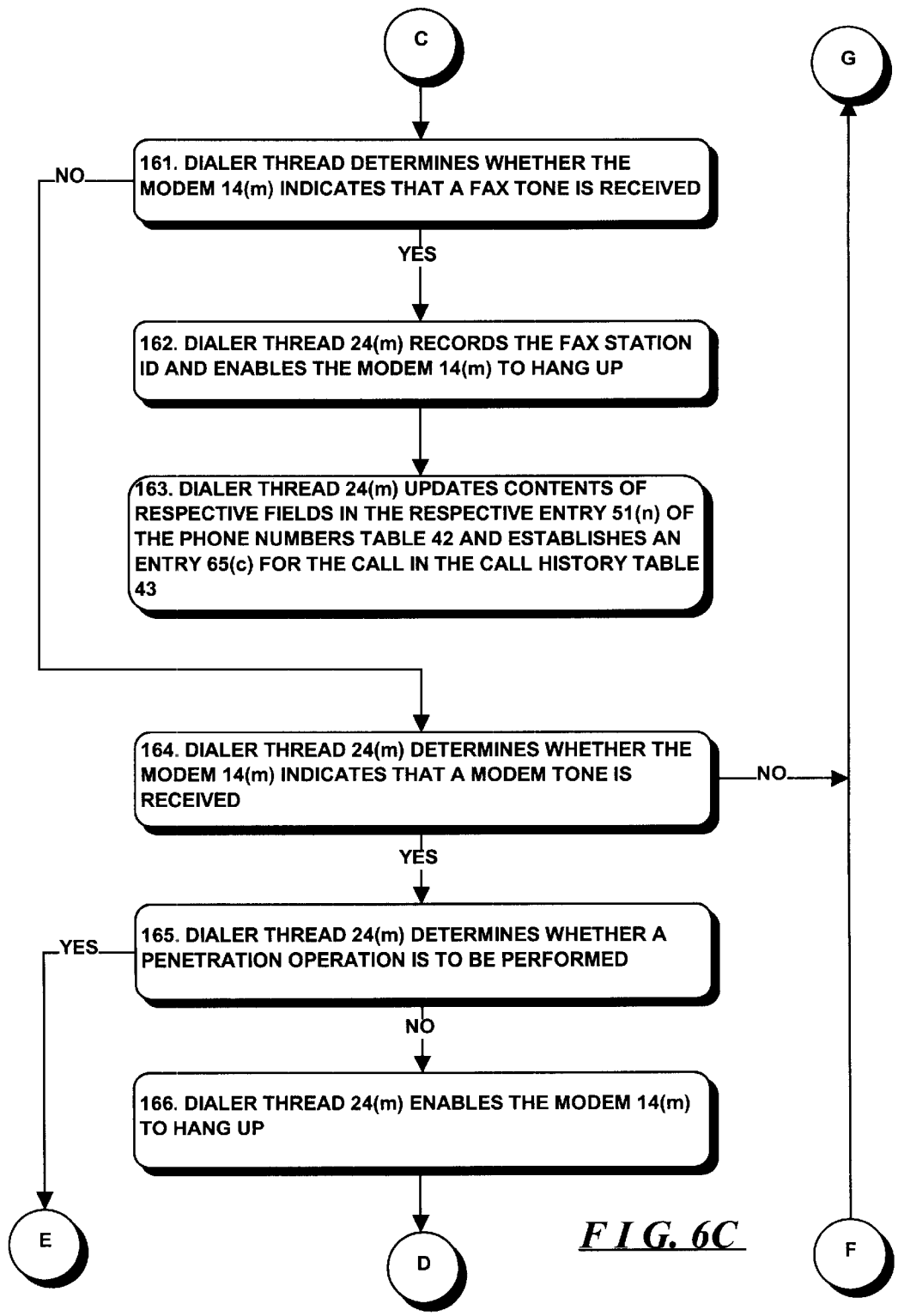
Figure 6D:
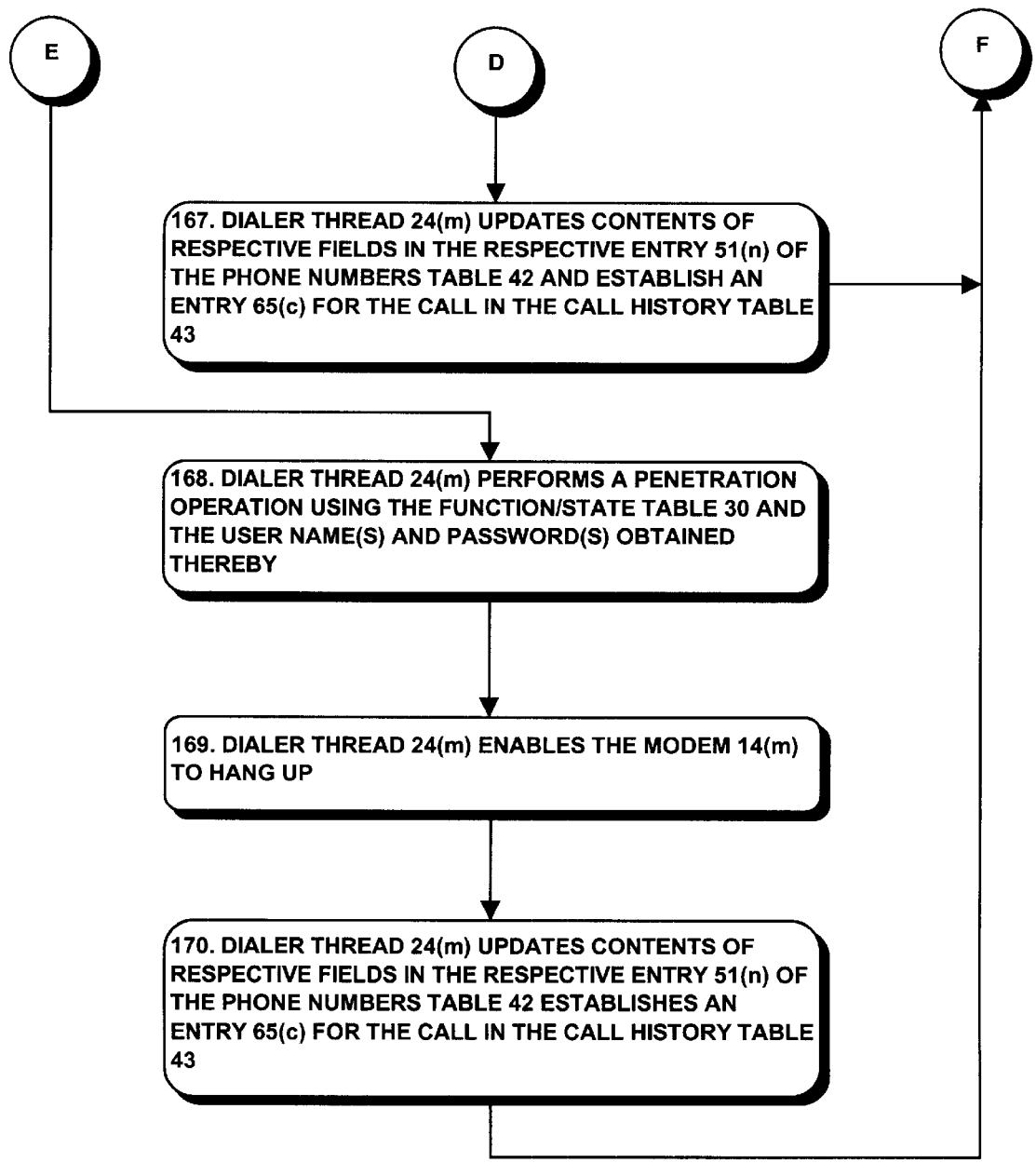

FIGS. 6A through 6D depicts operations performed by a dialer thread 24($m$) in connection with an entry 51($n$) provided thereto by the dialing control thread 25. With reference to FIG. 6A, after the dialer thread 24($m$) receives the information from the dialing control thread (reference step 114 above) (step 150), it enables the modem 14($m$) associated therewith to dial the telephone number (step 151) and waits for information from the modem 14($m$). If the dialer thread 24($m$) receives information that the telephone line is busy (step 152), it will instruct the modem to hang up (step 153) and enable the busy count value in the busy count field 60($n$) of the respective entry 51($n$) in the phone numbers table 42 to be incremented (step 154). On the other hand, if the dialer thread 24($m$) receives information indicating that the call has not been answered within the ring time specified in the information received from the dialing control thread 25 (step 155), it will instruct the modem to hang up (step 156).

Finally, if the dialer thread 24($m$) receives information indicating that the call has been answered within the specified ring time (step 157), its subsequent operations will be determined in part by how the call is answered. If the modem 14($m$) indicates that neither a fax tone nor a modem tone is received (step 158), the dialer thread 24($m$) can enable the modem 14($m$) to hang up, or, if it detects that an automatic voice answering system answers, penetrate the automatic voice answering system and perform predetermined operations in connection therewith (step 159) and update contents of respective fields in the respective entry 51($n$) of the phone numbers table and establish an entry 65($c$) in the call history table 43 for the call (step 160) so as to indicate that the call was answered by voice telephone equipment.

Similarly, if the modem 14($m$) indicates that a fax tone is received (step 161), the dialer thread 24($m$) can also enable the modem to receive the called station identifier ("CSID") and enable the modem 14($m$) to hang up (step 162) and update contents of respective fields in the respective entry 51($n$) of the phone numbers table 42 and establish an entry 65($c$) in the call history table 43 for the call (step 163).

Finally, if the modem 14($m$) indicates that a modem tone is received (step 164), subsequent operations depend on whether the information received from the dialing control thread 25 in step 150 indicated that a penetration output is to be performed. If the information did not indicate that a penetration operation is to be performed (step 165), the dialer thread 24($m$) can enable the modem 14($m$) to hang up (step 166) and update contents of respective fields in the respective entry 51($n$) of the phone numbers table 42 and establish an entry 65($c$) in the call history table 43 for the call (step 167).

On the other hand, if the dialer thread 24($m$) determines in step 164 that the information received from the dialing control thread 25 in step 150 did indicate that a penetration operation is to be performed, the dialer thread 24($m$) will perform a penetration operation using the function/state table 30 described above in connection with FIG. 3 and the user name(s) and password(s) obtained thereby from the user names/passwords table 45 (step 168). Following the penetration operation, the dialer thread 24($m$) can enable the modem 14($m$) to hang up (step 169) and update contents of respective fields in the respective entry 51($n$) of the phone numbers table 42 and establish an entry 65($c$) in the call history table 43 for the call (step 170).

Following step 160, 163, 167 or 170, the dialer thread 24($m$) returns to step 150 to await information from the dialing control thread enabling it to perform another call.

The invention provides a number of advantages. In particular, it provides a new flexible system for rapidly scan-dialing telephone numbers, classifying types of equipment which are connected to telephone lines with which the respective telephone numbers are associated, and generating reports based on the results of a scan. Since the system supports use of any numbers of modems in placing calls, time required to scan the telephone numbers can be reduced in relation to the number of modems. In addition, if, during a call, the system determines that the equipment that answers a call is a computer, the invention facilitates controlled attempts to penetrate the computer to determine selected characteristics of the computer, using a function/state table 30, which is easier to properly maintain and update than use of scripts. The system provides for multiple runs, during different time periods and using different numbers of rings for the respective time periods.

It will be appreciated that a number of modifications may be made to the system as described herein. For example, the detailed structure of the profile database may be modified in ways that will be apparent to those skilled in the art.

In addition, although the system 10 has been depicted as including one user interface 11 (FIG. 1) and one user interface thread 21 and one dialing control thread 25, it will be appreciated that a system in accordance with the invention may include a plurality of user interfaces and a plurality of user interface threads 21 and dialing control threads 25. Furthermore, it will be appreciated that a system in accordance with the invention need not include a user interface for receiving commands from and providing reports and other information to an operator; instead, commands may be provided by other mechanisms, such as one or more programs, and reports and other information may be provided to the program(s).

In addition, although the components described in connection with FIG. 2 have been described as being threads, they may be implemented in any form of module, including separate processes, and combination of threads and/or processes and the like. The threads and/or processes may be executed on one computer system or on a plurality of computer systems, and may communicate using any convenient conventional inter-thread, inter-process and/or inter-computer communication mechanism, as will be appreciated by those skilled in the art.

The system 10 has been described as initiating certain types of calls, illustratively fax and modem data calls to determine whether it receives the appropriate response from equipment connected to the called telephone line, and if it does not get the appropriate tone response determine that the respective type of equipment is not, or may not be, connected to the called telephone line. In such an arrangement, multiple calls may be needed to determine the actual type or types of equipment connected to the called telephone line. In addition, multiple calls may be used to determine various user names and passwords which may be used in connection with the equipment connected to the called telephone line. In addition, or alternatively, the system can initiate a call in such a manner that the type of equipment connected to the called telephone line will essentially identify itself. In such an arrangement, the modem 14(m) which places the call, instead of initiating a tone associated with a fax call or a modem data call, will wait for a time interval to determine whether it will receive a tone from the equipment connected to the called telephone line, and, if so, the type of tone, that is, whether the tone is characteristic of a fax machine or a data modem. This can avoid having the modem 14(m) bias the response from the equipment connected to the called telephone line.

In addition, although the system 10 has been described as responding to, classifying and penetrating certain types of equipment, in particular, voice telephones and automated voice answering machines, fax devices (including, for example, conventional fax machines and fax modems) and data modems, it will be appreciated that the system 10 may respond to, classify and, as appropriate, penetrate other types of equipment.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A telephone scan-dialing arrangement comprising:
   A. a plurality of dialer modules, each dialer module being associated with a respective modem, each dialer module being configured to
      (i) receive call control information specifying a telephone number to be dialed in connection with a call and call operations to be performed in connection with the call, one call operation comprising a connect operation,
      (ii) control its associated modem to call the telephone number provided thereto in the call control information and perform the specified call operations, the dialer module being configured to, during a connect operation, enable its respective modem to dial the telephone number to determine whether equipment connected to a called telephone line associated with the telephone number connects, and hang up after the equipment connects; and
      (iii) store call information related to the call; and
   B. a dialing control module configured to, during a scan-dial run, obtain from a profile a set of telephone numbers in response to selected telephone number selection criteria to be used during the scan-dial run, and generate for each telephone number call control information for provision to each dialer module as it finishes each call.

2. A telephone scan-dialing arrangement comprising:
   A. a plurality of dialer modules, each dialer module being associated with a respective modem, each dialer module being configured to
      (i) receive call control information specifying a telephone number to be dialed in connection with a call and call operations to be performed in connection with the call, one call operation comprising an identify operation;
      (ii) control its associated modem to call the telephone number provided thereto in the call control information and perform the specified call operations, the dialer module being configured to, during an identify operation, enable its respective modem to dial the telephone number and, if equipment connected to a called telephone line associated with the telephone number connects, classify the equipment according to a predetermined classification scheme; and
      (iii) store call information related to the call; and
   B. a dialing control module configured to, during a scan-dial run, obtain from a profile a set of telephone numbers in response to selected telephone number selection criteria to be used during the scan-dial run, and generate for each telephone number call control information for provision to each dialer module as it finishes each call.

3. A telephone scan-dialing arrangement as defined in claim 2 in which the dialer module classifies the equipment in relation to tonal information representative of signals generated by the equipment as received by its respective modem.

4. A telephone scan-dialing arrangement comprising:
   A. a plurality of dialer modules, each dialer module being associated with a respective modem, each dialer module being configured to
      (i) receive call control information specifying a telephone number to be dialed in connection with a call and call operations to be performed in connection with the call, one call operation comprising a penetrate operation,
      (ii) control its associated modem to call the telephone number provided thereto in the call control information and perform the specified call operations, the dialer module being configured to, during a penetrate operation, enable its respective modem to dial the telephone number and, if equipment connected to a called telephone line associated with the telephone number connects, determine predetermined internal characteristics of the equipment; and
      (iii) store call information related to the call; and
   B. a dialing control module configured to, during a scan-dial run, obtain from a profile a set of telephone numbers in response to selected telephone number selection criteria to be used during the scan-dial run, and generate for each telephone number call control information for provision to each dialer module as it finishes each call.

5. A telephone scan-dialing arrangement as defined in claim 4 in which the dialer module is configured to use a state/function table during the penetrate operation.

6. A telephone scan-dialing arrangement as defined in claim 4 in which, if the equipment is a computer, the dialer module is configured to determine identification of an operating system controlling the computer.

7. A telephone scan-dialing arrangement as defined in claim 6 in which, if use of the equipment is regulated by a user name, the dialer module is configured to determine the user name.

8. A telephone scan-dialing arrangement as defined in claim 7 in which, if use of the equipment is further regulated by a password, the dialer module is configured to determine the password.

9. A telephone scan-dialing arrangement as defined in claim 8 in which the dialer module is further configured to obtain user names and passwords from the profile.

10. A telephone scan-dialing arrangement as defined in claim 4 in which the dialer module is configured to use a state/function table during the penetrate operation.

11. A telephone scan-dialing arrangement comprising at least one dialer module and a dialing control module,
   A. each dialer module being associated with a respective modem, each dialer module being configured to receive call control information specifying a telephone number to be dialed in connection with a call and call operations to be performed in connection with the call and control its associated modem to call the telephone number provided thereto by the dialing control module and perform the specified call operations, and to store call information related to the call, one call operation comprising an identify operation, the dialer module during an identify operation being configured to enable its respective modem to dial the telephone number and, if equipment connected to a called telephone line associated with the telephone number connects, classify the equipment according to a predetermined classification scheme; and
   B. a dialing control module configured to, during a scan-dial run, obtain from a profile a set of telephone numbers in response to selected telephone number selection criteria to be used during the scan-dial run, and generate for each telephone number call control information for provision to said dialer module as it finishes each call.

12. A telephone scan-dialing arrangement as defined in claim 11 in which at least one class of said classification scheme is a fax machine class.

13. A telephone scan-dialing arrangement comprising:
   A. at least one dialer module, each dialer module being associated with a respective modem, each dialer module being configured to receive call control information specifying a telephone number to be dialed in connection with a call and call operations to be performed in connection with the call and control its associated modem to call the telephone number provided thereto by the dialing control module and perform the specified call operations, and to store call information related to the call, one call operation is a penetrate operation, the at least one dialer module during a penetrate operation being configured to enable its respective modem to dial the telephone number and, if equipment connected to a called telephone line associated with the telephone number connects, determine predetermined internal characteristics of the equipment; and
   B. a dialing control module configured to, during a scan-dial run, obtain from a profile a set of telephone numbers in response to selected telephone number selection criteria to be used during the scan-dial run, and generate for each telephone number call control information for provision to each dialer module as it finishes each call.

14. A telephone scan-dialing arrangement comprising:
   A. at least one dialer module, each dialer module being associated with a respective modem, each dialer module being configured to receive call control information specifying a telephone number to be dialed in connection with a call and call operations to be performed in connection with the call and control its associated modem to call the telephone number provided thereto by the dialing control module and perform the specified call operations, and to store call information related to the call, at least one element of said call information comprising audio information received by said modem; and
   B. a dialing control module configured to, during a scan-dial run, obtain from a profile a set of telephone numbers in response to selected telephone number selection criteria to be used during the scan-dial run, and generate for each telephone number call control information for provision to each dialer module as it finishes each call.

* * * * *